(12) United States Patent
Ferrari de Goes et al.

(10) Patent No.: US 12,505,598 B1
(45) Date of Patent: Dec. 23, 2025

(54) HAIR EDITING TECHNIQUES FOR ANIMATION

(71) Applicant: Pixar, Emeryville, CA (US)

(72) Inventors: Fernando Ferrari de Goes, Kensington, CA (US); Brandon Montell, San Francisco, CA (US); Jacob Brooks, Walnut Creek, CA (US)

(73) Assignee: PIXAR, Emeryville, CA (US)

( * ) Notice: Subject to any disclaimer, the term of this patent is extended or adjusted under 35 U.S.C. 154(b) by 222 days.

(21) Appl. No.: 18/223,699

(22) Filed: Jul. 19, 2023

(51) Int. Cl.
*G06T 13/40* (2011.01)

(52) U.S. Cl.
CPC .......... *G06T 13/40* (2013.01); *G06T 2210/36* (2013.01); *G06T 2210/56* (2013.01)

(58) Field of Classification Search
CPC .. G06T 13/40; G06T 2210/36; G06T 2210/56
See application file for complete search history.

(56) References Cited

U.S. PATENT DOCUMENTS

| | | | | |
|---|---|---|---|---|
| 7,880,744 | B2 * | 2/2011 | Bruderlin | G06T 17/00 345/428 |
| 2008/0170069 | A1 * | 7/2008 | Gibbs | G06T 17/30 345/419 |

OTHER PUBLICATIONS

Butts et al., "Engineering full-fidelity hair for Incredibles 2", ACM SIGGRAPH 2018 Talks, 2018, 1-2.
De Goes et al., "Discrete differential operators on polygonal meshes", ACM Transactions on Graphics (TOG), vol. 39, No. 4, Article 110, 2020, 1-14.
Iben et al., "Artistic simulation of curly hair", In Proceedings of the 12th ACM SIGGRAPH/Eurographics Symposium on Computer Animation, SCA '13, New York, NY, USA, 2013, 63-71.
Iben et al., "Holding the shape in hair simulation", ACM SIGGRAPH 2019 Talks, Article 59, 2019, 1-2.
Montell et al., "Hair Emoting with Style Guides in Turning Red", ACM SIGGRAPH 2022 Talks, 2022, 1-2.

* cited by examiner

*Primary Examiner* — Kee M Tung
*Assistant Examiner* — Biao Chen
(74) *Attorney, Agent, or Firm* — Kilpatrick Townsend & Stockton LLP

(57) ABSTRACT

Techniques for configuring hair for animation include obtaining a first representation of a set of hairs on a surface and a second representation of a subset of the hairs. At a vertex of the surface, an interpolated hair is generated by minimizing a difference between a shape of a first hair and the interpolated hair. An edit is received to modify the shape of the first hair. At the vertex, a modified interpolated hair is generated by minimizing the difference between the modified hair shape and the modified interpolated hair. The interpolated hair and the modified interpolated hair are projected onto a root of a second hair. Rotation parameters indicating a rotation and a scaling factor indicating a scale difference between the projected interpolated hair and the projected modified interpolated hair are computed. The rotation parameters and scaling factor are applied to the second hair to propagate the edit.

20 Claims, 9 Drawing Sheets

HAIR EDITING TECHNIQUES FOR ANIMATION

BACKGROUND

This disclosure relates to computer animation and computer-generated imagery. More specifically, this disclosure is related to techniques for editing hair using simplified hair sets.

With the wide-spread availability of computers, animators and computer graphics artists can rely upon computers to assist in the animation and computer-generated imagery (CGI) process. This may include using computers to have physical models be represented by virtual models in computer memory. This may also include using computers to facilitate animation, for example, by the designing, posing, deforming, coloring, painting, or the like, of characters or other elements of a computer animation display.

One core functional aspect of computer graphics is to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects such as characters, props, backgrounds, or the like, as models to be used in the rendered image or animation sequence. In some instances, the geometric description of an object may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly detailed image of a character or other object with the practical issues involved in allocating the resources (both human and computational) required to produce those visually appealing images.

One area of particular challenge in animation is creating lifelike hair or fur. A character may be covered in thousands or millions of individual hairs. In some applications, the hairs are individually adjusted by an artist (such as to convey emotion). Given the large number of hairs, it becomes tedious and computationally intensive to adjust the individual hairs. While hairs can be copied from one location to another, due to changes in local curvature on the surface (e.g., the scalp mesh on which the hair is dispersed), simple copying of hairs can create undesirable artifacts and inaccurate hair editing results.

Accordingly, what is desired are improved methods and apparatuses for solving some of the problems discussed above, while reducing further drawbacks, some of which are discussed above.

BRIEF SUMMARY

In various embodiments, edits can be applied to a coarse subset of a set of hairs on a surface. The edits can be interpolated to the set of hairs on the surface, while accounting for the geometry of the surface. This simplifies and speeds up the editing process by reducing the number of hairs that must be manually edited while maintaining an accurate representation of the local curvature.

In some embodiments, a method for configuring hair for animation includes performing, by a computer system: obtaining a first representation of a set of hairs on a surface, wherein the surface comprises a mesh with vertices; generating a second representation of a subset of the set of hairs; at a vertex of the surface, generating an interpolated hair by minimizing a shape difference between a shape of a first hair of the subset of the hairs and the interpolated hair; receiving an edit to modify the first hair to generate a modified hair shape; at the vertex of the surface, generating a modified interpolated hair by minimizing the shape difference between the modified hair and the modified interpolated hair; projecting the interpolated hair onto a root of a second hair of the set of hairs on the surface, thereby generating a projected interpolated hair; projecting the modified interpolated hair onto the root of the second hair of the set of hairs on the surface, thereby generating a projected modified interpolated hair; generating one or more rotation parameters indicating a rotation between the projected interpolated hair and the projected modified interpolated hair; computing a scaling factor indicating a scale difference between the projected interpolated hair and the projected modified interpolated hair; and applying the one or more rotation parameters and the scaling factor to the second hair of the set of hairs on the surface to propagate the edit to the second hair of the set of hairs on the surface.

In some aspects, the method further comprises performing a simulation to animate the hair on the surface. In some aspects, the first representation of the set of hairs on the surface is of a subset of a full set of hairs on the surface, and the method further comprises performing kernel interpolation to propagate the edit to the second hair of the set of hairs on the surface to one or more of the full set of hairs on the surface.

In some aspects, the method further comprises, before generating the interpolated hair, resampling the second representation of the subset of the hairs such that the hairs of the subset of the hairs have an equal number of points.

In some aspects, the method further comprises receiving, via a user interface, an indication of a percentage of the first representation of the set of hairs on the surface, wherein generating the second representation of the subset of the hairs comprises sampling the percentage of the first representation of the set of hairs on the surface. In some aspects, the edit to the first hair is further received via the user interface.

In some aspects, the one or more rotation parameters comprise a rotation matrix. In some aspects, multiple hairs are interpolated concurrently.

In some aspects, the surface is curved. In some aspects, minimizing the shape difference between the first hair of the subset of the hairs and the interpolated hair comprises minimizing a function of the vertices of the mesh and the shape of a plurality of hairs of the subset of the hairs, the plurality of hairs including the first hair.

These and other embodiments of the invention are described in detail below. For example, other embodiments are directed to systems, devices, and computer readable media associated with methods described herein.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION

Techniques and tools can be implemented that assist in the production of computer animation and computer graphics imagery. To shape hairs for animation, artists can shape guide hairs which are propagated to a full hair set. For certain applications, such as when a character is covered with hairs and the position of the hairs is important for conveying something such as the character's emotion, sculpting a large number (e.g., thousands or more) of individual guide hairs is cumbersome and time-consuming. The techniques described herein can use a subset of the guide hairs as an auxiliary representation for hair sculpting that coarsens the guide hairs. The deformations can be transformed from this coarse resolution back onto the dense hair set, while accounting for the surface on which the hairs are positioned (e.g., changes in curvature).

I. Pipeline for Hair Editing

Figure 1:
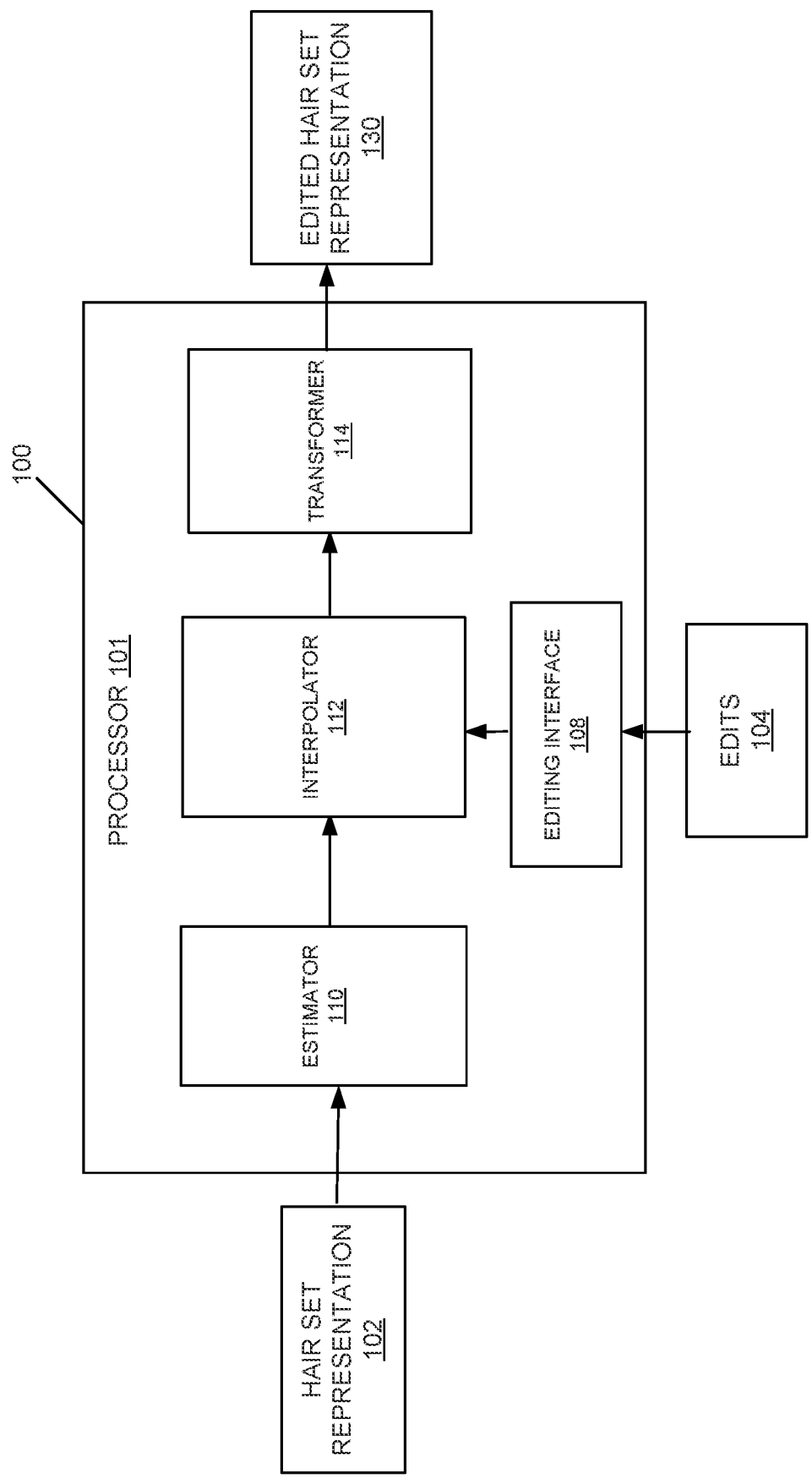
FIG. 1 is a simplified block diagram of an example of a system for configuring hair for animation according to some embodiments.
Figure 7:
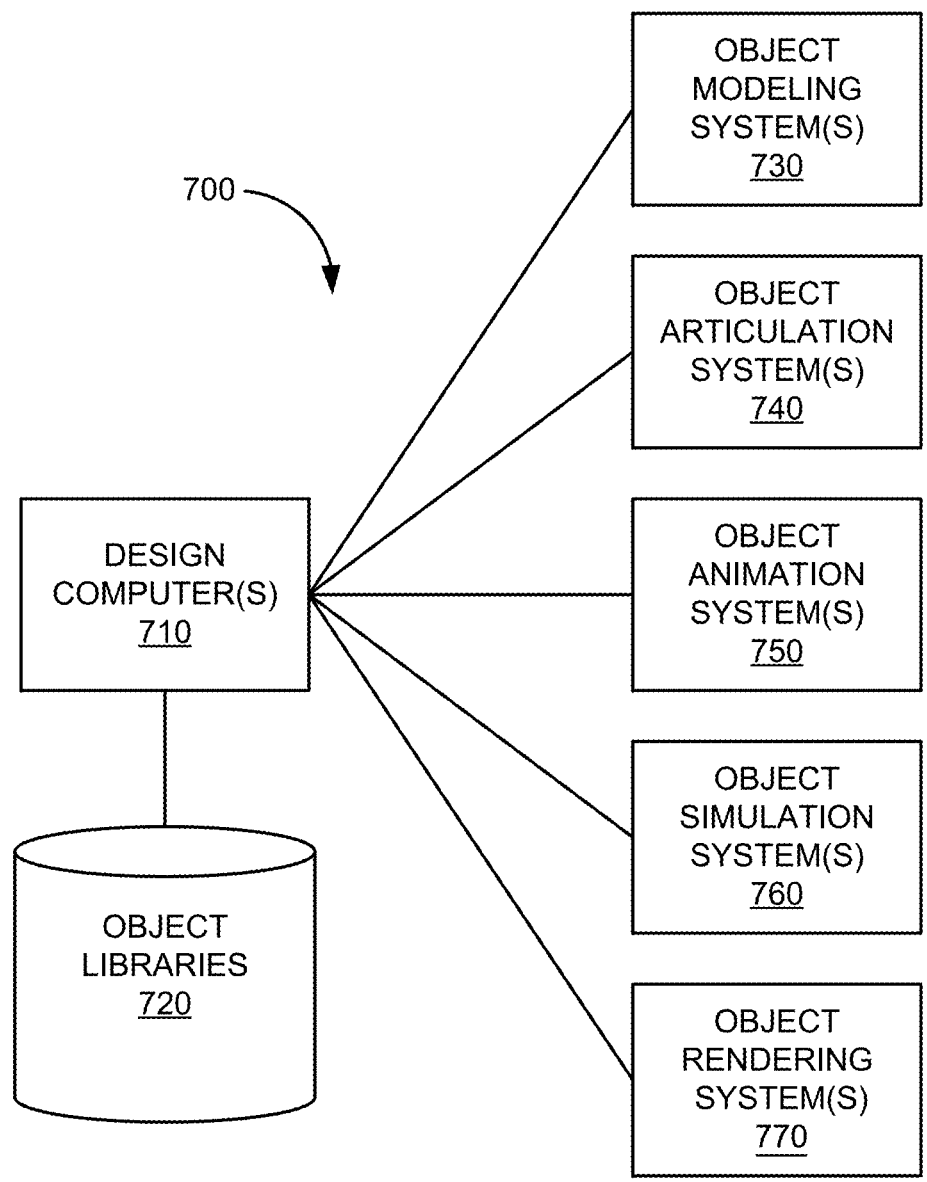
FIG. 7 is a simplified block diagram of a system for creating computer graphics imagery (CGI) and computer-aided animation that may implement or incorporate various embodiments of the present invention.
Figure 8:
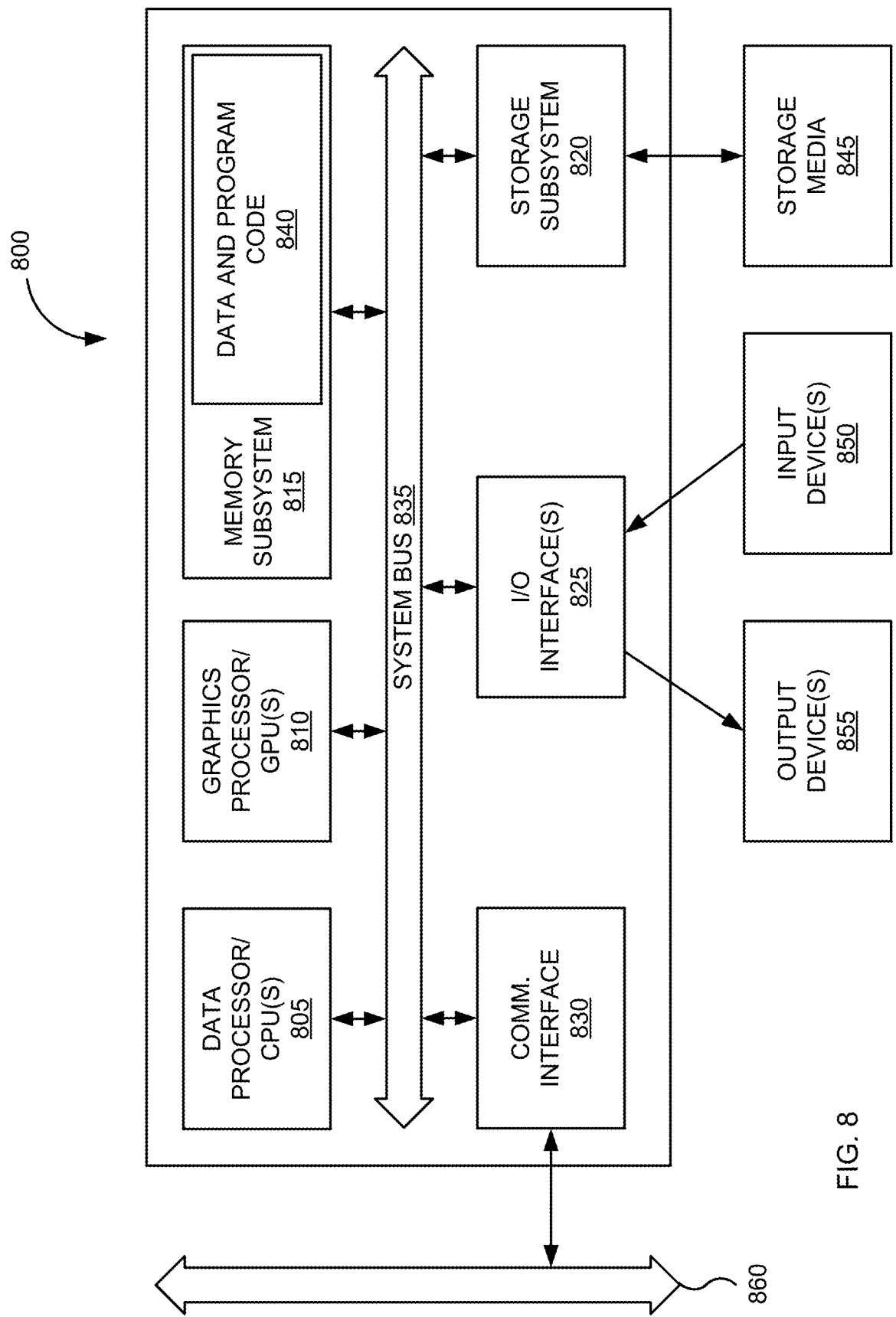
FIG. 8 is a block diagram of a computer system or information processing device that may incorporate an embodiment, be incorporated into an embodiment, or be used to practice any of the innovations, embodiments, and/or examples found within this disclosure.

FIG. 1 simplified block diagram of an example of a computer system 100 for configuring hair for animation and CGI, according to some embodiments. As shown, the computer system 100 can include a processor 101 configured to implement computer program components, which can include an editing interface 108, an estimator 110, an interpolator 112, and a transformer 114. In some implementations, the computer system 100 is part of, or coupled to, systems for animating and rendering objects, as shown in FIGS. 7 and 8. The computer system 100 and its functions may accordingly be part of an overall animation pipeline as further described below with respect to FIGS. 7 and 8.

In some embodiments, the processor 101 obtains one or more hair set representations 102. The processor 101 may, for example, receive the hair set representation 102 from a remote computing device (e.g., from a remote animation computer). Alternatively, or additionally, the obtains the hair set representation 102 from local storage.

A hair set representation may, for example, include curves or line segments representing what will ultimately be a final set of rendered hairs for animation. The one or more hair set representations 102 are provided to the estimator 110 for processing. In some instances, the processor obtains a first representation of a set of hairs on a surface, where the first representation of the set of hairs corresponds to a subset of a full set of hairs on the surface that will ultimately be rendered. As further described below with respect to FIG. 3, this can correspond to simulation hairs used for simulating and rendering the full hair set.

In some embodiments, the estimator 110 includes software and/or hardware configured to identify and generate a coarse representation of the set of hairs on the surface (e.g., a second representation of a subset of the set of hairs). The estimator 110 may, for example, sample a subset of the hairs in the first representation of the set of hairs on the surface. In some instances, the estimator 110 receives parameters, such as a percentage of the hairs to sample, from the editing interface 108, and samples the subset of the hairs based on the received percentage.

Figure 6:
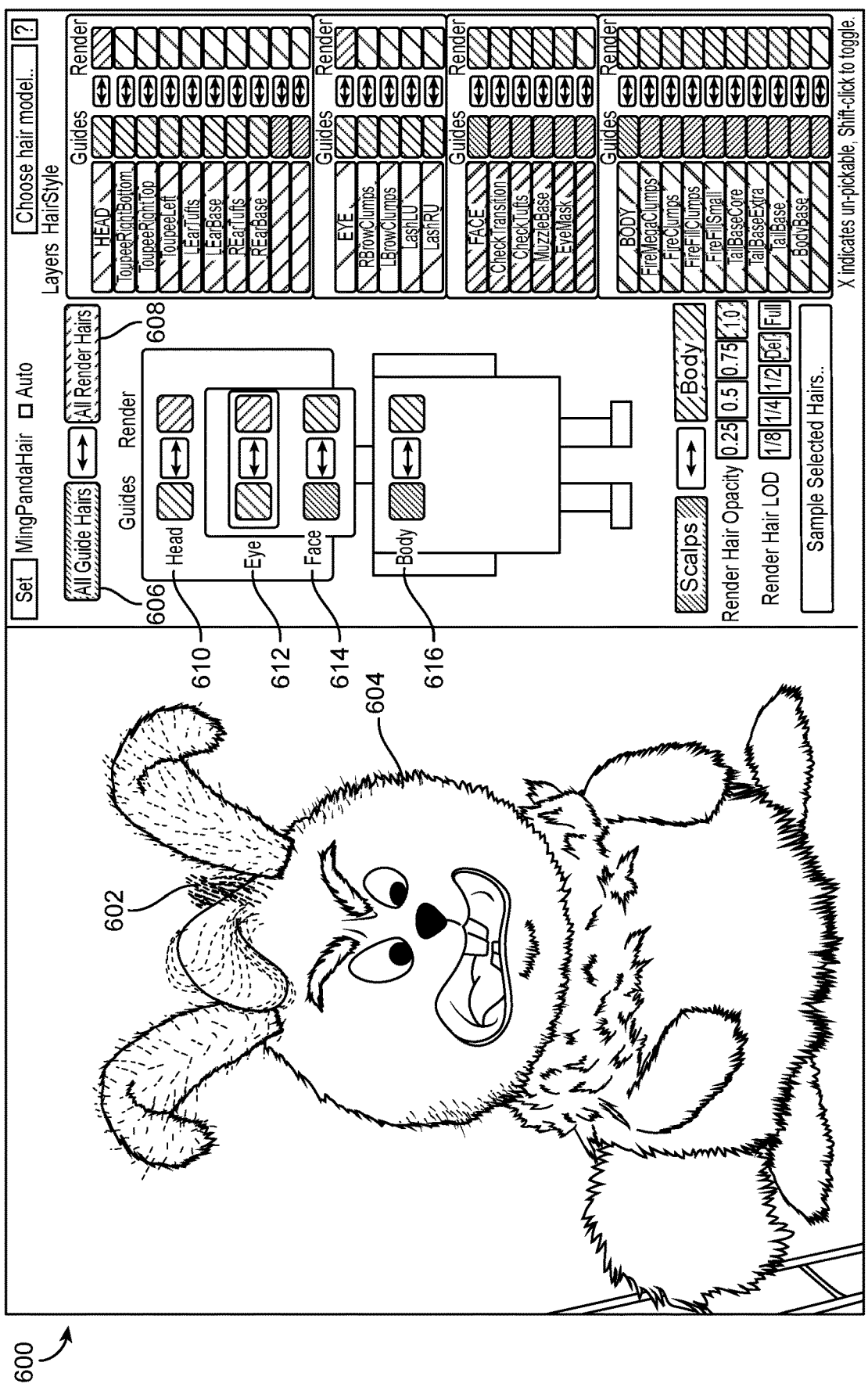
FIG. 6 illustrates an example graphical user interface for configuring hairs for animation according to some embodiments.

In some embodiments, the editing interface 108 includes software and/or hardware configured to accept user input to configure hair. The editing interface 108 can accept user input specifying a granularity for the coarse hair set, as described above with respect to the estimator 110. The editing interface 108 can further accept user input to style hair. For example, an animator can interact with displayed hairs to move the shape and/or size of the hairs. An example editing interface is illustrated in FIG. 6.

In some embodiments, the interpolator 112 includes software and/or hardware configured to interpolate hair characteristics, such as the shape of a hair, to another location on a surface. The interpolator 112 propagates hair shape from one hair to another, taking into account the local surface, as described herein.

In some embodiments, the transformer 114 includes software and/or hardware configured to apply a transformation to a hair. The transformer 114 identifies rotation parameters and scale parameters, and applies them to a hair, to effect the transformation. The transformer 114 is applied such that edits made to the coarse representation of the hairs are applied to the hairs. The output of the transformer 114 is an edited hair set representation 130.

II. Types of Hair

Figure 2:
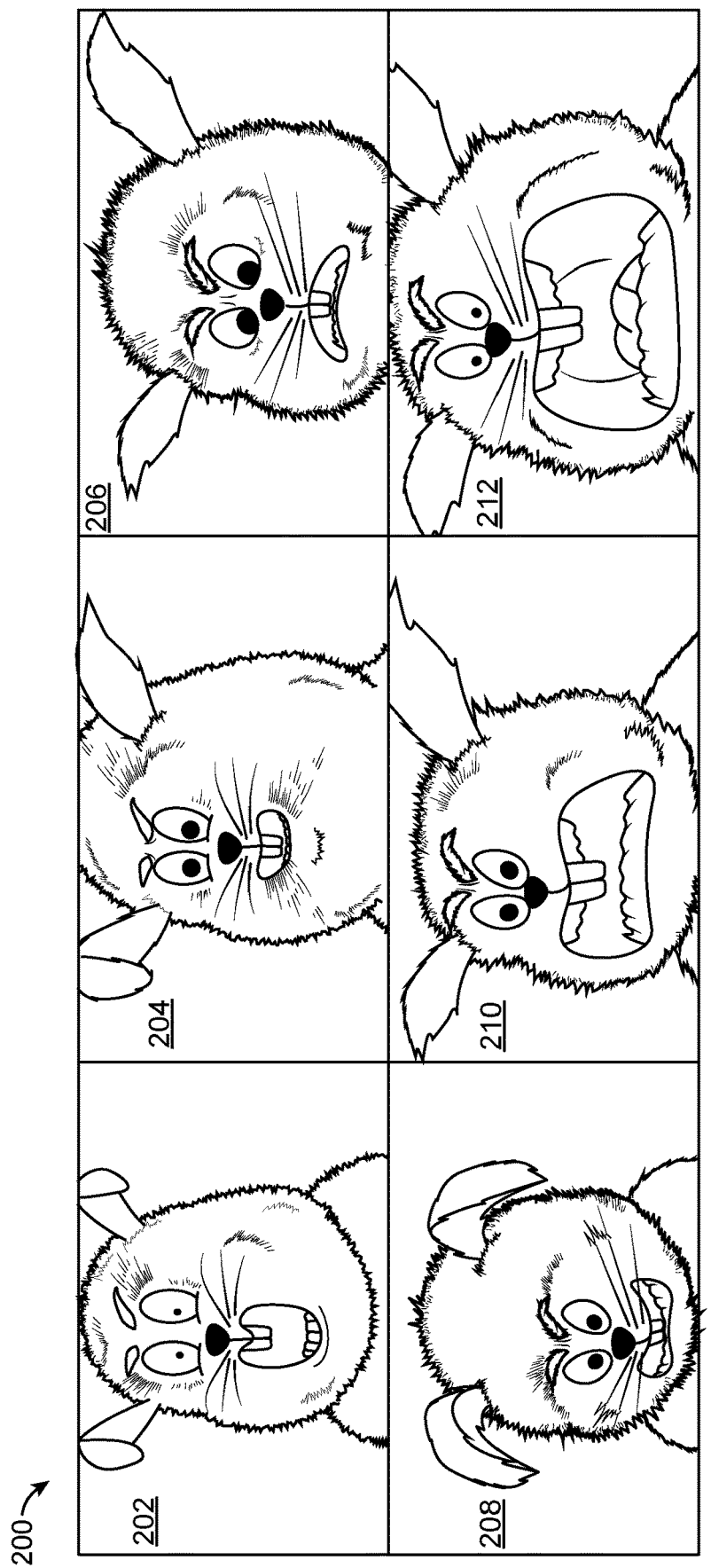
FIG. 2 illustrates examples of emotive hair positioning according to some embodiments.
Figure 3:
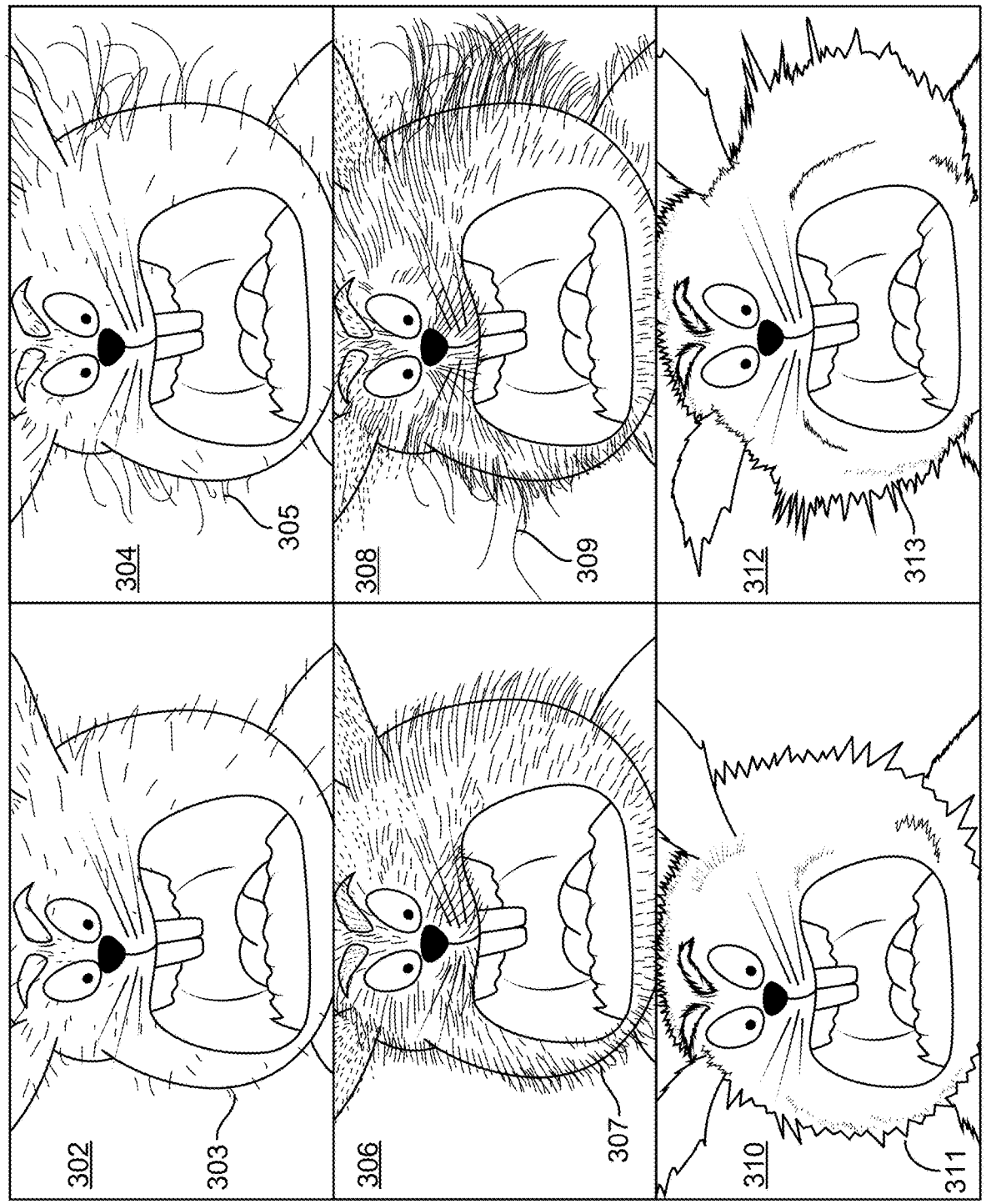
FIG. 3 illustrates examples of guide hairs and render hairs for animation according to some embodiments.

FIGS. 2 and 3 illustrate example hair sets, including expressive hairs and a coarse hair set.

A. Expressive Hairs

FIG. 2 illustrates example animation frames with expressive hairs. The character illustrated in FIG. 2 is covered with millions of hairs, which may behave differently in each frame to reflect the character's emotional states. This presents a challenge in animating a large number of hairs in a large number of frames.

In animation frame 202, the character is surprised, and hairs are relatively smooth, standing on end in some places. In animation frames 204, 206, 208, 210, and 212, the character appears progressively angrier, and the hairs become progressively more pronounced in line with the change in emotion. In each of the animation frames, 204, 206, 208, 210, and 212, the hairs have different properties.

B. Coarse Hair Sets

FIG. 3 illustrates example hair sets that can be used for editing and rendering hair for animation. As noted above, it is challenging to create lifelike hair or fur, particularly when there are many hairs and/or many stylistic edits to the hairs. In particular, while hairs can be copied from one location to another, due to changes in local curvature on the surface, simple copying of hairs can create undesirable artifacts and inaccurate hair editing results. The techniques described herein use multiple sets of guide hairs of varying coarseness and a surface-aware propagation method to avoid such issues.

FIG. 3 illustrates examples of hair sets of various degrees of coarseness. The images on the left (302, 306, and 310) illustrate an original set of hairs before edits are applied. The images on the right (304, 308, and 312) illustrate a modified set of hairs after edits are applied. As shown in FIG. 3, the edits make some of the hairs longer, some of the hairs at different angles, and other modifications.

Images 302 and 304 illustrate a coarse hair set of hairs for editing (referred to as style guide hairs 303, 305 or a second subset of the hairs). As shown in FIG. 3, the style guide hairs 303, 305 are fewer, and more spaced apart, than the other hair sets in images 306-312. The style guide hairs 303, 305 can be displayed to, and manipulated by, an animator (e.g., in an interface such as that illustrated in FIG. 6). The animator can manipulate the style guide hairs 303, 305 to provide edits to the system.

Images 306 and 308 illustrate a denser hair set (referred to as simulation hairs 307, 309 or a first subset of the hairs). The simulation hairs 307, 309 are used for simulation in the animation process. Edits to the style guide hairs 303, 305 are propagated to the simulation hairs 307, 309. The simulation hairs 307, 309 can be built into a character's default rig or generated on demand based on the needs of each shot.

Images 310 and 312 illustrate a set of hairs used for animation, or final render hairs 311, 313. These are the final hairs that are seen in the animation. The set of hairs can include thousands or millions of individual hairs. Hair shape information based on user edits is propagated from the simulation hairs 307, 309 to the full hair sets of render hairs 311, 313 as shown in images 310 and 312.

III. Use of Guide Hairs in Hair Editing

Figure 4A:
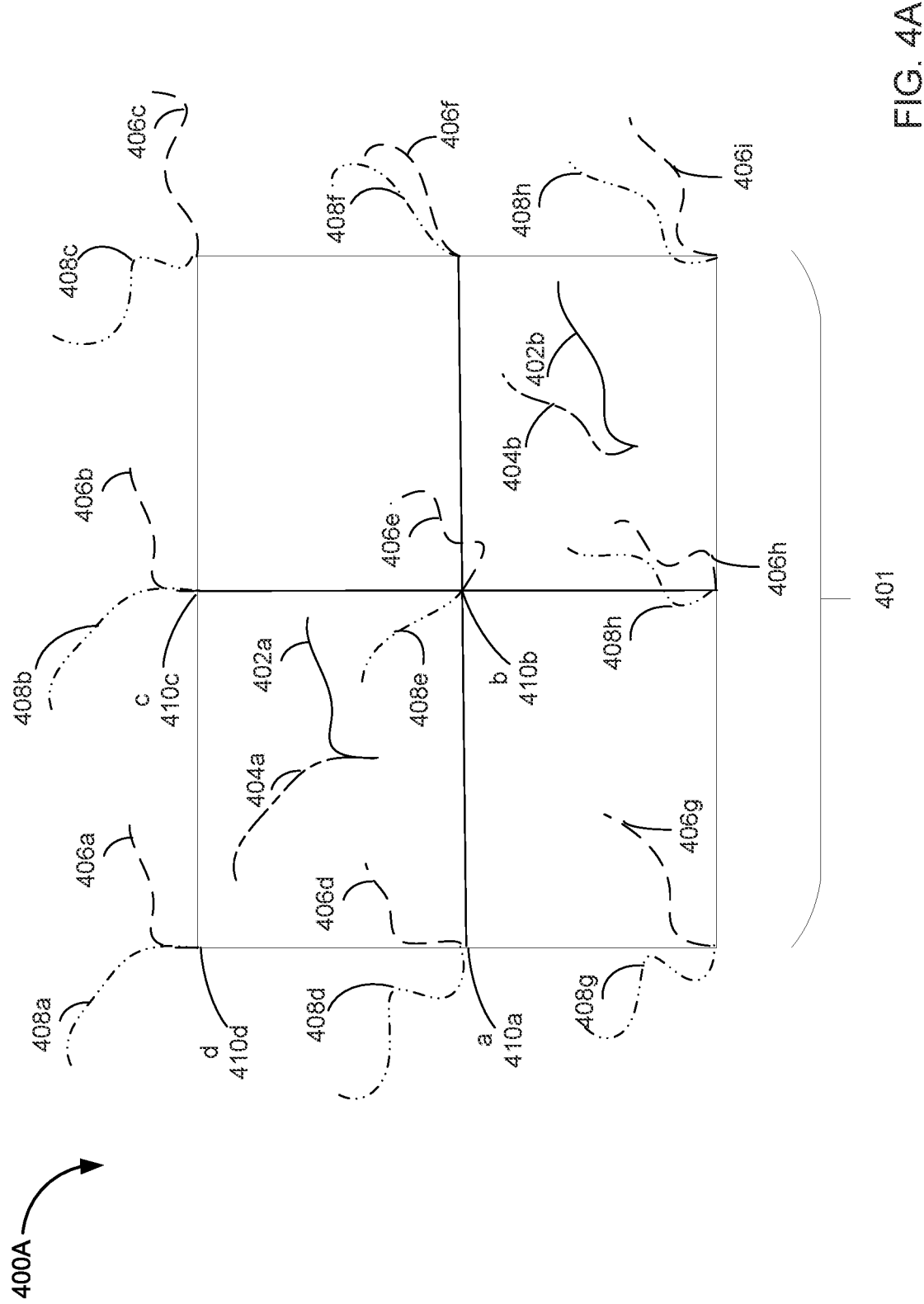
FIG. 4A and FIG. 4B illustrate guide hairs as used in the method of FIG. 5 according to some embodiments.
Figure 4B:
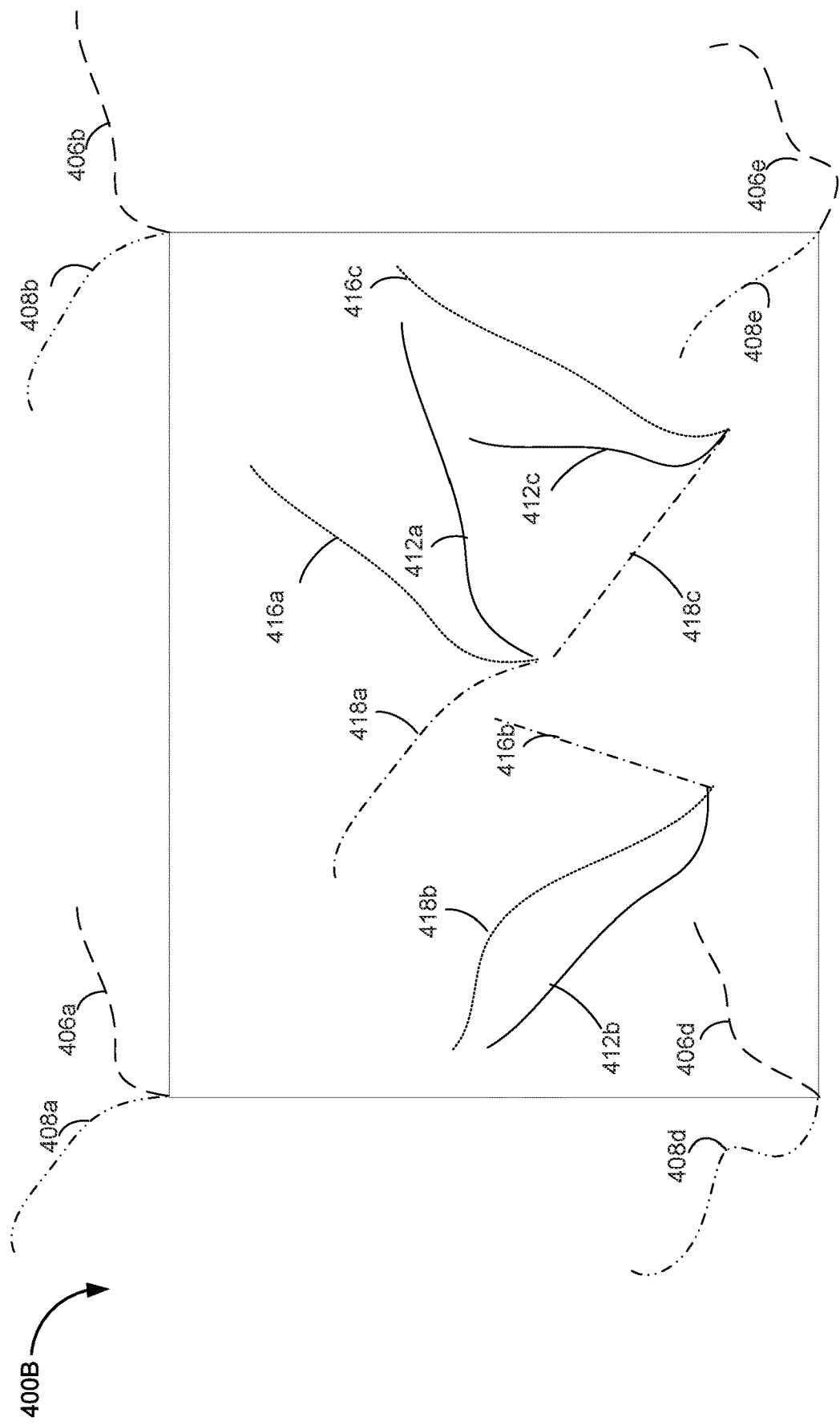
Figure 5:
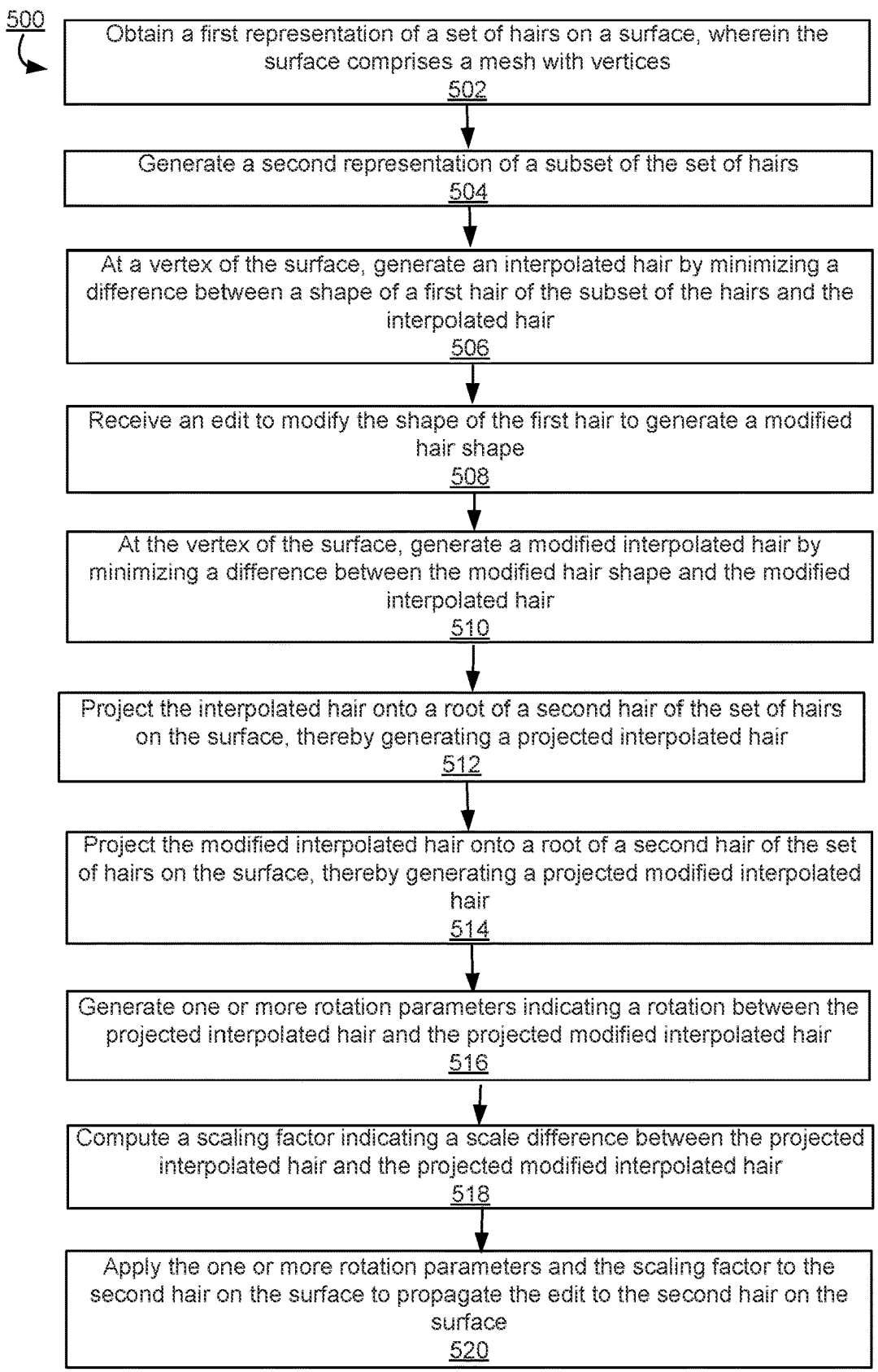
FIG. 5 is a simplified flowchart of a method for configuring hair for animation, according to some embodiments.

FIGS. 4A-5 illustrate the use of guide hairs for hair editing. The guide hairs illustrated in FIG. 4A and FIG. 4B are used to receive user edits on a simplified coarse hair set and propagate the edits from coarser hair sets to more dense hair sets (e.g., from the style guide hairs 303, 305 of FIG. 3 to the simulation hairs 307, 309 of FIG. 3 to the full hair set 311, 313 of FIG. 3, using the method 500 of FIG. 5).

A. Interpolated Hairs

FIG. 4A and FIG. 4B illustrate examples of interpolated hairs as used in the method 500 of FIG. 5. As described in further detail below with respect to FIG. 5, edits to style guide hairs (e.g., style guide hairs 303, 305 of FIG. 3) are propagated to simulation hairs (e.g., simulation hairs 307, 309 of FIG. 3) by interpolating the hairs to different points on the surface mesh on which the hairs are dispersed. FIG. 4A illustrates interpolated hairs at the vertexes of a mesh, which corresponds to a first step in the hair propagation process. FIG. 4B illustrates interpolated hairs at the root of guide hairs, which corresponds to a subsequent step in the hair propagation process.

Referring now to FIG. 4A, the mesh (illustrated with the rectangles) on the surface 401 on which the hair is dispersed (e.g., the body of a character) includes vertices a 410*a*, b 410*b*, c 410*c*, and d 410*d*. Dispersed throughout the surface are hairs 402*a*, 402*b* which are part of the coarse subset of hairs (e.g., style guide hairs 303, 305 of FIG. 3). These hairs are modified (e.g., by an editor) to generate modified hairs 404*a*, 404*b*.

The interpolated hairs 406*a*, 406*b*, 406*c*, 406*d*, 406*e*, 406*f*, 406*g*, 406*h*, and 406*i* are interpolated hairs generated based on the hairs 402*a*, 402*b*. The modified interpolated hairs 408*a*, 408*b*, 406*c*, 408*d*, 408*e*, 408*f*, 408*g*, 408*h*, and 408*i* are interpolated hairs generated based on the hairs 404*a*, 404*b*. The hairs are interpolated to the vertices a 410*a*, b 410*b*, c 410*c*, and d 410*d* of the mesh.

In some examples, the interpolated hairs are generated using a minimization that considers all the hairs in the second set of hairs (e.g., hairs 402*a* and 402*b* in this example). The minimization is of a function, which can include a smoothness term:

$$|a-b|^2 + |a-d|^2 + |b-c|^2 \quad [1]$$

and a stiffness term:

$$\left|\frac{a+b+c+d}{4} - s\right|^2 \quad [2]$$

where a, b, c, and d are vertices of the mesh and s represents a hair. To perform the minimization, the smoothness term and the stiffness term above are written as a linear system:

$$Ax=b \quad [3],$$

where A is a sparse matrix representing the vertices of the mesh, b is a vector representing the s values for the hairs in the second set of hairs, and x is a vector of the positions of the modified interpolated hairs. In some aspects, since the vertices of the mesh are fixed, to make the interpolation process more efficient, A is precomputed and cached. When edits to the hairs are received, a new b value is computed, and the precomputed A sparse matrix is retrieved. Since A is a sparse matrix, Equation 3 can be solved quickly.

Referring now to FIG. 4B, the interpolated hairs 406*a*, 406*b*, 406*d*, and 406*e*, as well as the modified interpolated hairs 408*a*, 408*b*, 408*d*, and 408*e*, are then projected to the root positions of hairs 412*a*, 412*b*, and 412*c* of the denser first representation of the set of hairs (e.g., simulation hairs such as simulation hairs 307, 309 of FIG. 3). Based on the curves of the interpolated hairs 406*a*, 406*b*, 406*d*, and 406*e*, a projected interpolated hair is generated at the root position of each of the hairs 412*a*, 412*b*, and 412*c*. Based on the modified interpolated hairs 408*a*, 408*b*, 408*d*, and 408*e*, a projected modified interpolated hair is generated at the root position of each of the hairs 412*a*, 412*b*, and 412*c*. As described further below with respect to FIG. 5, these projected hairs are used to determine rotation and scale parameters for propagating the edits to the simulation hairs 412*a*, 412*b*, and 412*c*.

Projected interpolated hair 416*a* and projected modified interpolated hair 418*a* are projected onto the root of hair 412*a*. Projected interpolated hair 416*b* and projected modified interpolated hair 418*b* are projected onto the root of hair 412*b*. Projected interpolated hair 416*c* and projected modified interpolated hair 418*c* are projected onto the root of hair 412*c*. The projected interpolated hairs 416*a*, 416*b*, 416*c* are sized and shaped according to the interpolated hairs 406*a*, 406*b*, 406*d*, 406*e* at the vertices. The projected modified interpolated hairs 418*a*, 418*b*, 418*c* are sized and shaped according to the modified interpolated hairs 408*a*, 408*b*, 408*d*, 408*e* at the vertices.

As further described below with respect to FIG. 5, the instances, the interpolated hairs can be projected onto the root position by averaging nearby vertex curves based on barycentric coordinates. By projecting and interpolating the hairs based on vertices in this multi-step process, the shape of the hairs as well as the local curvature of the surface are taken into consideration, which improves the accuracy of the propagated hairs across the surface and enables the use of coarser hair sets, which reduces the processing and manual intervention required to manipulate larger hair sets.

B. Hair Editing

FIG. 5 is a simplified flowchart of a method 500 for editing hair for animation, according to some embodiments. The method 500 can be used to simplify the process of configuring hairs for animation, while accounting for variations on the surface of the character being animated, using different guide hairs of different coarseness, as illustrated in FIG. 3.

The method presented in FIG. 5 and described below is intended to be illustrative and non-limiting. It is appreciated that the processing steps may be performed in an order different from that depicted in FIG. 5 and that not all the steps depicted in FIG. 5 need be performed. In certain implementations, the method 500 may be implemented by a computer system, such as the computer system 100 shown in FIG. 1 and/or those shown in FIGS. 7 and 8.

In some embodiments, the method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At step 502, the computer system obtains a first representation of a set of hairs on a surface (e.g., the simulation hairs 307, 308 in FIG. 3). The surface includes a mesh with vertices. The surface may be curved, with different local curvatures across the surface (e.g., the head and/or body of a character as shown in FIGS. 2 and 3). As used herein, "hair" can refer to hair and/or fur. The first representation of the set of hairs on the surface is a set of hairs for simulation (i.e., simulation hairs). The first representation of the set of hairs on the surface in some instances is a subset of a full set of hairs on the surface (i.e., of a final render set of hairs for animation such as render hairs 311, 313 of FIG. 3). The computer system may, for example, receive the first representation of the set of hairs from another device (e.g., from a remote computer that generated the first representation of the set of hairs), or retrieve the first representation of the set of hairs from local storage.

At step 504, the computer system generates a second representation of a subset of the set of hairs (e.g., the style guide hairs 303, 305 depicted in FIG. 3). In some instances, the computer system generates the second representation of the subset of the set of hairs by sampling a coarse subset of first representation of the set of hairs on the surface (e.g., 10% of the simulation hairs, 20% of the simulation hairs, etc.). In some instances, the percentage of hairs sampled is guided by user input. For example, the computer system receives, via a user interface, an indication of a percentage of the first representation of the set of hairs on the surface, and generates the second representation of the subset of the hairs by sampling the percentage of the first representation of the set of hairs on the surface. In some aspects, the second representation of the subset of the set of hairs is generated by performing k-means clustring on the root points of the first representation of the set of hairs on the surface based on the user configured percentage. A hair of the subset of the set of hairs is then selected for the hair closest to the centroid of each cluster. In some instances, additional user input is received to add or remove individual hairs manually. The second representation of the subset of the set of hairs can be built into a default hair rig for a character or generated on demand based on the needs of each shot.

At step 506, at a vertex of the surface, the computer system generates an interpolated hair by minimizing a shape difference between a first hair of the subset of the hairs and the interpolated hair. The difference is minimized in an optimization process that identifies one or more vectors for the vertex of the surface mesh such that the difference between the vectors shared between edges is as small as possible. The vectors correspond to line segments that consitute the hair. The minimization function is a function of the shape of the first hair. In some aspects, the minimizaiton function is a function of the vertices of the mesh and the shape of a plurality of hairs of the subset of the hairs, the plurality of hairs including the first hair. The minimization function may further incude a smoothness term (similar to a Laplacian) and a stiffness term. In some aspects, the smoothness term is based on the norm of the difference between the value interpolated at the root of the interpolated hair and the value interpolated at the root of the first hair. Techniques for generating the interpolated hairs are described in further detail above with respect to FIG. 4A, which shows examples of interpolated hairs. In some aspects, the minimization is such that the segment at one vertex should be as close as possible to the average of the neighbors. The interpolation process can also takes into account the local curvature of the surface. Techniques for manipulating hairs on a surface mesh are described in DeGoes et al., Discrete Differential Operators on Polygonal Meshes, ACM Trans Graph. 39, 4, Article 110 (2020), which is incorporated by reference in its entirety.

In some instances, before generating the interpolated hair, the computer system resamples the second representation of the subset of the hairs such that the hairs of the subset of the hairs have an equal number of points. Without this step, different representations of different hairs may have different numbers of points (e.g., representing longer or shorter hairs). When each segment has an equal number of points, for each segment, the corresponding segment of another hair can be ascertained in a straightforward fashion, which streamline the interpolation process. After interpolation, the computer system resamples the hairs again to return to the original number of points per hair.

In some instances, the computer system interpolates multiple hairs concurrently. For example, the hair is organized in layers, and the computer system interpolates each hair in a layer concurrently (e.g., in parallel using multithreaded programming). The computer system then interpolates each hair in the next layer, and so forth, until all hairs in the subset of the hairs have been interpolated to a vertex. In some aspects, each hair in the subset of the hairs is interpolated to one or more nearest vertices.

At step 508, the computer system receives an edit to modify the shape of the first hair to generate a modified hair shape. The edit may be received from a user (e.g., an animator) to adjust the shape of the first hair. In some instances, the edit to the first hair is received via a user interface such as that shown in FIG. 6.

At step 510, the computer system generates, at a vertex of the surface, a modified interpolated hair by minimizing the shape difference between the modified hair and the modified interpolated hair. Step 510 is performed in a similar fashion to step 506, using the modified hair shape.

At step 512, the computer system projects the interpolated hair onto a root of a second hair of the set of hairs on the surface (e.g., one of the simulation hairs such as 412a in FIG. 4B and 307 in FIG. 3), thereby generating a projected interpolated hair. In some instances, the interpolated hair is projected onto the root position by averaging nearby vertex curves based on barycentric coordinates. In some aspects, the projection of the interpolated hair is based on the location of root relative to the corners of the mesh (e.g., as shown in FIG. 4B and described above). If the root is closer to one corner, the result should also be more similar to that shape of the interpolated hair at that corner of the mesh. A hair with a size, shape, and orientation based on that of the interpolated hair is placed at the same point on the surface as the root of the second hair. Example projected interpolated hairs are illustrated and described in further detail above with respect to FIG. 4B.

At step 514, the computer system projects the modified interpolated hair onto a root of a second hair of the set of hairs on the surface, thereby generating a projected modified interpolated hair. A hair with a size, shape, and orientation based on that of the modified interpolated hair is placed at the same point on the surface as the root of the second hair. The projection of the modified interpolated hairs is performed similarly to the projection of the interpolated hairs at step 512.

At step 516, the computer system generates one or more rotation parameters indicating a rotation between the projected interpolated hair and the projected modified interpolated hair. In some instances, the one or more rotation parameters are in the form of a rotation matrix. The rotation parameters are determined by comparing the orientation of the projected interpolated hair and the projected modified interpolated hair.

At step 518, the computer system computes a scaling factor indicating a scale difference between the projected interpolated hair and the projected modified interpolated hair. The scale difference indicates a difference in size between the projected interpolated hair and the projected modified interpolated hair. The scale difference is determined by comparing the size of the projected interpolated hair to the size of the projected modified interpolated hair.

At step 520, the computer system applies the one or more rotation parameters and the scaling factor to the second hair of the set of hairs on the surface to propagate the edit to the second hair of the set of hairs on the surface. A transformation specified by the rotation parameters and the scaling factor is applied as a transformation to deform the shape of the second hair of the set of hairs on the surface. This applies the edits to the second hair on the surface while remaining aware of local topology.

In some aspects, steps 506-520 are performed for each hair in the first representation of the set of hairs on the surface and the second representation of the subset of the set of hairs on the surface. For example, at step 506, one or more interpolated hairs are generated for each hair in the subset of the set of hairs, and at step 510, one or more modified interpolated hairs are generated for each modified interpolated hair, i.e., each hair for which an edit is received at step 508. The interpolated hairs may be generated concurrently or in sequence, and the modified interpolated hairs may be generated concurrently or in sequence. Likewise, at steps 512 and 514, all of the interpolated hairs and modified interpolated hairs are projected onto hairs of the set of hairs on the surface. The interpolated hairs may be projected concurrently or in sequence, and the modified interpolated hairs may be projected concurrently or in sequence.

In some embodiments, the computing system performs a simulation to animate the hair on the surface. For example, in the simulation process, the motion and position of the hairs over time is determined in response to simulated forces or conditions. This simulates the behavior of the hair in response to a physics model and/or animation of one or more characters and objects within a computer-generated scene. Hair simulation techniques are described in further detail in Iben et al., Holding the Shape in Hair Simulation, in ACM SIGGRAPH Talks, Article 59 (2019), which is incorporated by reference in its entirety.

In some embodiments, the propagation of the edits to the hairs described above can be performed before the simulation in order to set the undeformed simulation state. In this case, when generating the second representation of the subset of the set of hairs at step 504, the hairs of the first representation of the set of hairs are copied and warped to the current pose of the mesh. Alternatively, the propagation of the edits to the hairs can be performed post-simulation, allowing edits to the final groom shape. In this case, the hairs of the subset of the set of hairs should be maintained in sync with the latest simulation run. This is achieved by generating the second representation of the subset of the set of hairs at step 504 based on the rest state of the hairs on the first representation of the set of hairs, adding a deformer that keeps track of upstream changes to the hairs of the set of hairs. In some embodiments, the simulation is performed on the first representation of the set of hairs, or simulation hairs. The information is then propagated to the full set of hairs.

In some embodiments, the computing system performs kernel interpolation to propagate the edit to the second hair of the set of hairs on the surface to one or more of the full set of hairs on the surface. The final render hairs are populated by scattering root points over the surface mesh and blending nearby guide hairs through kernel interpolation. In some aspects, the root hairs are scattered over the surface based on density maps, which may be configured by a user. The propagation of information from the simulation hairs to the full set of hairs can further include the motion information generated in the simulation.

IV. Hair Editing Interface

FIG. 6 illustrates an example hair editing interface 600. The hair editing interface 600 includes functionality for a user to manage hair layers and configure hairs for animation. The hair editing interface 600 presents top level hair scopes (e.g., head, eye, face, and body), and allows users to toggle the visibility and selectability of respective render and guide hairs.

The hair editing interface 600 includes a panel on the left side displaying a character with guide hairs 602 as well as rendered hairs 604. The guide hairs 602 can be manipulated by a user to adjust the length and/or orientation of the hairs, which is then propagated to other hairs as described herein. The rendered hairs 604 show the look of the final rendered hairs for animation.

The hair editing interface 600 includes a panel on the right side allowing a user to toggle through different hair layers. The selectable icons in the hair editing interface 600 includes an all guide hairs button 606. Upon user selection of the all guide hairs button 606, all guide hairs 602 are displayed on the character on the left. Alternatively, or additionally, the user can select certain layers of the guide hairs 602 to display or not display, using toggle buttons for the head 610, eye 612, face 614, and body 616. Similarly, upon user selection of the all render hairs button 608, all render hairs 604 are displayed on the character on the left. Alternatively, or additionally, the user can select certain layers of the render hairs 604 to display or not display, using toggle buttons for the head 610, eye 612, face 614, and body 616. The full list of hair layers is also shown on the right side for more granular control. This enables artists to select individual hairs in each hair layer. The hair editing interface 600 further includes functionality to quickly perform actions such as updating the hair level of detail and viewing surface meshes.

In some aspects, the hair editing interface 600 further includes functionality to paint a density map indicating regions where more dense or less dense hair is desired. The hair editing interface 600 can further be used to paint hair lengths for a local region and/or for individual hairs. The hair editing interface 600 can further be used to adjust hair texture (e.g., straight or curly).

Using the hair editing interface 600, an artist can more efficiently manage render hairs and guide hairs. The hair editing interface 600 can significantly reduce the amount of time spent on tasks that would otherwise require manually searching through a scene graph for objects in the hair rig.

V. Computer Systems

FIG. 7 is a simplified block diagram of system 700 for creating computer graphics imagery (CGI) and computer-aided animation that may implement or incorporate various embodiments. In this example, system 700 can include one or more design computers 710, object library 720, one or more object modeling systems 730, one or more object articulation systems 740, one or more object animation systems 750, one or more object simulation systems 760, and one or more object rendering systems 770. Any of the systems 730-770 may be invoked by or used directly by a user of the one or more design computers 710 and/or automatically invoked by or used by one or more processes associated with the one or more design computers 710. Any of the elements of system 700 can include hardware and/or software elements configured for specific functions.

The one or more design computers 710 can include hardware and software elements configured for designing CGI and assisting with computer-aided animation. Each of the one or more design computers 710 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 710 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 710 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 710 acting as an articulator may employ one or more systems or tools to design, create, or modify controls or animation variables (avers) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 710 acting as an animator may employ one or more systems or tools to specify motion and position of one or more objects over time to produce an animation.

Object library 720 can include elements configured for storing and accessing information related to objects used by the one or more design computers 710 during the various stages of a production process to produce CGI and animation. Some examples of object library 720 can include a file, a database, or other storage devices and mechanisms. Object library 720 may be locally accessible to the one or more design computers 710 or hosted by one or more external computer systems.

Some examples of information stored in object library 720 can include an object itself, metadata, object geometry, object topology, rigging, control data, animation data, animation cues, simulation data, texture data, lighting data, shader code, or the like. An object stored in object library 720 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 730 can include hardware and/or software elements configured for modeling one or more objects. Modeling can include the creating, sculpting, and editing of an object. In various embodiments, the one or more object modeling systems 730 may be configured to generate a model to include a description of the shape of an object. The one or more object modeling systems 730 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 730 may further generate model data (e.g., 2D and 3D model data) for use by other elements of system 700 or that can be stored in object library 720. The one or more object modeling systems 730 may be configured to allow a user to associate additional information, metadata, color, lighting, rigging, controls, or the like, with all or a portion of the generated model data.

The one or more object articulation systems 740 can include hardware and/or software elements configured to articulating one or more computer-generated objects. Articulation can include the building or creation of rigs, the rigging of an object, and the editing of rigging. In various embodiments, the one or more articulation systems 740 can be configured to enable the specification of rigging for an object, such as for internal skeletal structures or eternal features, and to define how input motion deforms the object.

One technique is called "skeletal animation," in which a character can be represented in at least two parts: a surface representation used to draw the character (called the skin) and a hierarchical set of bones used for animation (called the skeleton).

The one or more object articulation systems 740 may further generate articulation data (e.g., data associated with controls or animations variables) for use by other elements of system 700 or that can be stored in object library 720. The one or more object articulation systems 740 may be configured to allow a user to associate additional information, metadata, color, lighting, rigging, controls, or the like, with all or a portion of the generated articulation data.

The one or more object animation systems 750 can include hardware and/or software elements configured for animating one or more computer-generated objects. Animation can include the specification of motion and position of an object over time. The one or more object animation systems 750 may be invoked by or used directly by a user of the one or more design computers 710 and/or automatically invoked by or used by one or more processes associated with the one or more design computers 710.

In various embodiments, the one or more animation systems 750 may be configured to enable users to manipulate controls or animation variables or utilized character rigging to specify one or more key frames of animation sequence. The one or more animation systems 750 generate intermediary frames based on the one or more key frames. In some embodiments, the one or more animation systems 750 may be configured to enable users to specify animation cues, paths, or the like according to one or more predefined sequences. The one or more animation systems 750 generate frames of the animation based on the animation cues or paths. In further embodiments, the one or more animation systems 750 may be configured to enable users to define animations using one or more animation languages, morphs, deformations, or the like.

The one or more object animations systems 750 may further generate animation data (e.g., inputs associated with controls or animations variables) for use by other elements of system 700 or that can be stored in object library 720. The one or more object animations systems 750 may be configured to allow a user to associate additional information, metadata, color, lighting, rigging, controls, or the like, with all or a portion of the generated animation data.

The one or more object simulation systems 760 can include hardware and/or software elements configured for simulating one or more computer-generated objects. Simulation can include determining motion and position of an object over time in response to one or more simulated forces or conditions. The one or more object simulation systems 760 may be invoked by or used directly by a user of the one or more design computers 710 and/or automatically invoked by or used by one or more processes associated with the one or more design computers 710.

In various embodiments, the one or more object simulation systems 760 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 760 may be used to simulate the behavior of objects, such as hair, fur, and cloth, in response to a physics model and/or animation of one or more characters and objects within a computer-generated scene.

The one or more object simulation systems 760 may further generate simulation data (e.g., motion and position of an object over time) for use by other elements of system 700 or that can be stored in object library 720. The generated simulation data may be combined with or used in addition to animation data generated by the one or more object animation systems 750. The one or more object simulation systems 760 may be configured to allow a user to associate additional information, metadata, color, lighting, rigging, controls, or the like, with all or a portion of the generated simulation data.

The one or more object rendering systems 770 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 770 may be invoked by or used directly by a user of the one or more design computers 710 and/or automatically invoked by or used by one or more processes associated with the one or more design computers 710. One example of a software program embodied as the one or more object rendering systems 770 can include PhotoRealistic RenderMan, or PRMan, produced by Pixar Animations Studios of Emeryville, California.

In various embodiments, the one or more object rendering systems 770 can be configured to render one or more objects to produce one or more computer-generated images or a set of images over time that provide an animation. The one or more object rendering systems 770 may generate digital images or raster graphics images.

In various embodiments, a rendered image can be understood in terms of a number of visible features. Some examples of visible features that may be considered by the one or more object rendering systems 770 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 770 may further render images (e.g., motion and position of an object over time) for use by other elements of system 700 or that can be stored in object library 720. The one or more object rendering systems 770 may be configured to allow a user to associate additional information or metadata with all or a portion of the rendered image.

FIG. 8 is a block diagram of computer system 800. FIG. 8 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 800 and any of its components or subsystems can include hardware and/or software elements configured for performing methods described herein.

Computer system 800 may include familiar computer components, such as one or more one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity and inter-device communication.

The one or more data processors or central processing units (CPUs) 805 can execute logic or program code or for providing application-specific functionality. Some examples of CPU(s) 805 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 810 can execute logic or program code associated with graphics or for providing graphics-specific functionality. GPUs 810 may include any conventional graphics processing unit, such as those provided by conventional video cards. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like.

Memory subsystem 815 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 815 can include data and program code 840.

Storage subsystem 820 can also store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of data and program code 840 may be stored using storage subsystem 820.

The one or more input/output (I/O) interfaces 825 can perform I/O operations. One or more input devices 850 and/or one or more output devices 855 may be communicatively coupled to the one or more I/O interfaces 825. The one or more input devices 850 can receive information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can output information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements. A display device or monitor may be used with computer system 800 and can include hardware and/or software elements configured for displaying information.

Communications interface 830 can perform communications operations, including sending and receiving data. Some examples of communications interface 830 may include a network communications interface (e.g., Ethernet, Wi-Fi, etc.). For example, communications interface 830 may be coupled to communications network/external bus 860, such as a computer network, a USB hub, or the like. A computer system can include a plurality of the same components or subsystems, e.g., connected together by communications interface 830 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 800 may also include one or more applications (e.g., software components or functions) to be executed by a processor to execute, perform, or otherwise implement techniques disclosed herein. These applications may be embodied as data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for configuring hair for animation, the method comprising performing, by a computer system:
    obtaining a first representation of a set of hairs on a surface, wherein the surface comprises a mesh with vertices;
    generating a second representation of a subset of the set of hairs;
    at a vertex of the surface, generating an interpolated hair by minimizing a shape difference between a first hair of the subset of the hairs and the interpolated hair;
    receiving an edit to modify a shape of the first hair to generate a modified hair;
    at the vertex of the surface, generating a modified interpolated hair by minimizing the shape difference between the modified hair and the modified interpolated hair;
    projecting the interpolated hair onto a root of a second hair of the set of hairs on the surface, thereby generating a projected interpolated hair;
    projecting the modified interpolated hair onto the root of the second hair of the set of hairs on the surface, thereby generating a projected modified interpolated hair;
    generating one or more rotation parameters indicating a rotation between the projected interpolated hair and the projected modified interpolated hair;
    computing a scaling factor indicating a scale difference between the projected interpolated hair and the projected modified interpolated hair; and
    applying the one or more rotation parameters and the scaling factor to the second hair of the set of hairs on the surface to propagate the edit to the second hair of the set of hairs on the surface.

2. The method of claim 1, further comprising:
    performing a simulation to animate the hair on the surface.

3. The method of claim 1, wherein the first representation of the set of hairs on the surface is of a subset of a full set of hairs on the surface, the method further comprising:
    performing kernel interpolation to propagate the edit to the second hair of the set of hairs on the surface to one or more of the full set of hairs on the surface.

4. The method of claim 1, further comprising:
    before generating the interpolated hair, resampling the second representation of the subset of the hairs such that the hairs of the subset of the hairs have an equal number of points.

5. The method of claim 1, further comprising:
    receiving, via a user interface, an indication of a percentage of the first representation of the set of hairs on the surface,
    wherein generating the second representation of the subset of the hairs comprises sampling the percentage of the first representation of the set of hairs on the surface.

6. The method of claim 5, wherein the edit to the first hair is further received via the user interface.

7. The method of claim 1, wherein the one or more rotation parameters comprise a rotation matrix.

8. The method of claim 1, wherein multiple hairs are interpolated concurrently.

9. The method of claim 1, wherein the surface is curved.

10. The method of claim 1, wherein minimizing the shape difference between the first hair of the subset of the hairs and the interpolated hair comprises minimizing a function of the vertices of the mesh and the shape of a plurality of hairs of the subset of the hairs, the plurality of hairs including the first hair.

11. A system for configuring hair for animation, the system comprising one or more processors configured to:
    obtain a first representation of a set of hairs on a surface, wherein the surface comprises a mesh with vertices;
    generate a second representation of a subset of the set of hairs;
    at a vertex of the surface, generate an interpolated hair by minimizing a shape difference between a first hair of the subset of the hairs and the interpolated hair;
    receive an edit to modify a shape of the first hair to generate a modified hair;

at the vertex of the surface, generate a modified interpolated hair by minimizing the shape difference between the modified hair and the modified interpolated hair;

project the interpolated hair onto a root of a second hair of the set of hairs on the surface, thereby generating a projected interpolated hair;

project the modified interpolated hair onto the root of the second hair of the set of hairs on the surface, thereby generating a projected modified interpolated hair;

generate one or more rotation parameters indicating a rotation between the projected interpolated hair and the projected modified interpolated hair;

compute a scaling factor indicating a scale difference between the projected interpolated hair and the projected modified interpolated hair; and apply the one or more rotation parameters and the scaling factor to the second hair of the set of hairs on the surface to propagate the edit to the second hair of the set of hairs on the surface.

12. The system of claim 11, the one or more processors further configured to:
perform a simulation to animate the hair on the surface.

13. The system of claim 11, wherein the first representation of the set of hairs on the surface is a subset of a full set of hairs on the surface, the one or more processors further configured to:
perform kernel interpolation to propagate the edit to the second hair of the set of hairs on the surface to one or more of the full set of hairs on the surface.

14. The system of claim 11, the one or more processors further configured to:
before generating the interpolated hair, resample the second representation of the subset of the hairs such that the hairs of the subset of the hairs have an equal number of points.

15. The system of claim 11, the one or more processors further configured to:
receive, via a user interface, an indication of a percentage of the first representation of the set of hairs on the surface,
wherein generating the second representation of the subset of the hairs comprises sampling the percentage of the first representation of the set of hairs on the surface.

16. The system of claim 15, wherein the edit to the first hair is further received via the user interface.

17. The system of claim 11, wherein the one or more rotation parameters comprise a rotation matrix.

18. The system of claim 11, wherein multiple hairs are interpolated concurrently.

19. The system of claim 11, wherein the surface is curved.

20. The system of claim 11, wherein minimizing the shape difference between the first hair of the subset of the hairs and the interpolated hair comprises minimizing a function of the vertices of the mesh and the shape of a plurality of hairs of the subset of the hairs, the plurality of hairs including the first hair.

* * * * *